(12) United States Patent
Tanaka

(10) Patent No.: US 8,767,160 B2
(45) Date of Patent: Jul. 1, 2014

(54) LIQUID CRYSTAL DISPLAY PANEL

(75) Inventor: Shinichiro Tanaka, Tottori (JP)

(73) Assignee: Japan Display West Inc., Aichi-Ken (JP)

( * ) Notice: Subject to any disclaimer, the term of this patent is extended or adjusted under 35 U.S.C. 154(b) by 947 days.

(21) Appl. No.: 11/287,210

(22) Filed: Nov. 28, 2005

(65) Prior Publication Data

US 2006/0132684 A1 Jun. 22, 2006

(30) Foreign Application Priority Data

Nov. 30, 2004 (JP) ................................. 2004-345554

(51) Int. Cl.
*G02F 1/1343* (2006.01)

(52) U.S. Cl.
USPC ............................ 349/146; 349/139; 349/143

(58) Field of Classification Search
USPC ............................. 349/113–115, 139–152, 38
See application file for complete search history.

(56) References Cited

U.S. PATENT DOCUMENTS

| | | | | |
|---|---|---|---|---|
| 5,831,708 A * | 11/1998 | Hiraishi et al. | ............... | 349/143 |
| 6,297,862 B1 * | 10/2001 | Murade | ............................ | 349/44 |
| 6,587,162 B1 * | 7/2003 | Kaneko et al. | ................... | 349/43 |
| 6,587,163 B1 * | 7/2003 | Nakayama et al. | ............. | 349/43 |
| 2001/0026343 A1 * | 10/2001 | Kubo et al. | .................... | 349/139 |
| 2001/0040656 A1 | 11/2001 | Na et al. | | |
| 2003/0071951 A1 * | 4/2003 | Jun | ............................... | 349/129 |
| 2003/0107694 A1 * | 6/2003 | Song | ............................. | 349/129 |
| 2004/0246416 A1 * | 12/2004 | Maeda | .......................... | 349/114 |

FOREIGN PATENT DOCUMENTS

| | | |
|---|---|---|
| JP | 11-24225 | 1/1999 |
| JP | 2002-014349 | 1/2002 |
| JP | 2003-167253 | 6/2003 |
| JP | 2004-69767 | 3/2004 |

OTHER PUBLICATIONS

Chinese Office Action dated Aug. 10, 2007, Application No. 200510126085.9.

\* cited by examiner

*Primary Examiner* — Jessica M Merlin
(74) *Attorney, Agent, or Firm* — K&L Gates LLP

(57) ABSTRACT

An MVA type liquid crystal display panel of the present invention comprises a first substrate where a light transmission section consisting of a pixel electrode 15a, whose corner portions are chamfered, is formed at each position partitioned by scanning lines 13 and signal lines 14 that are arranged in a matrix state, in which a protruding electrode 40 extending from the pixel electrode 15a is formed between the chamfered position of the corner portion and the scanning line 13 to prevent the inclination of liquid crystal molecules due to the effect of the potential difference occurring between the scanning line and a common electrode. According to the present invention, it is possible to provide an MVA type of liquid crystal display panel having high contrast, where contrast reduction caused by the inclination of liquid crystal molecules due to the effect of the potential difference occurring between the scanning line and a common electrode is controlled, even where the liquid crystal display panel employs pixel electrodes with chamfered corner portions.

9 Claims, 10 Drawing Sheets

LIQUID CRYSTAL DISPLAY PANEL

BACKGROUND OF THE INVENTION

1. Field of the Invention

The present invention relates to a liquid crystal display panel, particularly to a transmissive or semi-transmissive liquid crystal display panel of the multi-domain vertically aligned (MVA) type having good display quality, where discrimination is suppressed.

2. Background Art

Liquid crystal display devices are generally thin and lightweight and have a low level of power consumption, and are broadly used for various items, from portable terminals to large-sized television sets. The vertically aligned (VA) type of liquid crystal display panel is known to be used in liquid crystal display devices.

In a VA type of liquid crystal display panel 60, as shown in FIG. 5, liquid crystal having negative dielectric anisotropy is filled between a pair of substrates 62, 64, a pixel electrode 61 being arranged on the substrate 62, and a common electrode 63 being arranged on the substrate 64. Alignment films 66, 67 respectively reside on top of the substrates 62, 64 in vertical alignment treatment, while liquid crystal molecules 65 are vertically aligned when no electric field is applied to the pixel electrode 61 and common electrode 63 as shown in FIG. 5A. Polarizing plates 68, 69 are respectively arranged in a cross-nicol state outside the substrates 62, 64.

Then, since the liquid crystal molecules 65 between the substrates are vertically aligned when no electric field is applied between the electrodes 61, 63, linearly polarized transmission light which has passed one polarizing plate directly passes through a liquid crystal layer and is blocked by another polarizing plate to create a dark state, that is, black display. Further, since the liquid crystal molecules 65 between the substrates are roughly aligned horizontally as shown in FIG. 5B when electric field is applied between the electrodes 61, 63, the linearly polarized transmission light that has passed one polarizing plate becomes birefringent to form elliptically polarized transmission light when passing through the liquid crystal layer, and the light passes through another polarizing plate to create a bright state, that is, white display.

In Japanese Laid-Open Patent Publication No. 11-024225, an MVA type of liquid crystal display panel has been introduced where protrusions or grooves are provided in a pixel to form a plurality of domains in one pixel for the purpose of improving further the viewing angle of the VA type of liquid crystal display panel.

The pixel constitution of the conventional MVA type liquid crystal display panel will be described with reference to FIGS. 6 and 7. Note that FIG. 6 is a plane view of a pixel of an MVA type liquid crystal display panel 70, while FIG. 7 is a cross-sectional view taken along VII-VII line of FIG. 6.

Scanning lines 72 and signal lines 73 are wired in a matrix state on a transparent first substrate 71 such as a glass substrate via a gate insulating film 71'. The region surrounded by the scanning lines 72 and the signal lines 73 corresponds to one pixel, a pixel electrode 74 being arranged in the region, and a TFT 75 that serves as a switching device for connection to the pixel electrode 74 is formed at the crossing area between the scanning line 72 and the signal line 73. A part of the pixel electrode 74 overlaps with an adjacent scanning line 72 while an insulating film 71" is made to lie therebetween, and the overlapped area works as a retention capacitance. A plurality of slits 76 (described later) is formed on the pixel electrode 74. The alignment film 77 covering the pixel electrode 74 is accorded vertical alignment treatment.

A black matrix 79 is formed on a transparent second substrate 78 such as a glass substrate so as to partition each pixel, and a color filter 80 is laid corresponding to each pixel. Color filters 80 in red (R), green (G) and blue (B) are provided for each pixel. A common electrode 81 made of a transparent indium tin oxide (ITO) electrode, for example, is laid on the color filter 80, while protrusions 82 having a predetermined pattern are formed on the common electrode 81, and an alignment film 83 set in vertical alignment treatment covers the common electrode 81 and the protrusions 82.

A liquid crystal layer 84 having negative dielectric anisotropy is arranged to lie between a pair of substrates 71, 78. Then, when an electric field is not generated between the pixel electrode 74 and the common electrode 81, liquid crystal molecules 84' are restricted by the alignment films 77, 83 and become vertically aligned, and the liquid crystal molecules 84' become horizontally inclined when an electric field is generated between the pixel electrode 74 and the common electrode 81. At this point, the liquid crystal molecules 84' are restricted by the slits 76 and the protrusions 82 and become inclined in a predetermined direction, and thus a plurality of domains can be formed in one pixel. Note that FIG. 7 schematically shows the state where electric field is generated between the pixel electrode 74 and the common electrode 81.

Further, a first polarizing plate 85 is arranged outside the first substrate 71, and a second polarizing plate 86 is arranged outside the second substrate 78, with both polarizing plates being set in such manner that their transmission axes become orthogonal to each other. The orientation of the polarizing plates 85, 86 is set based on the relation between the transmission axes and the orientation of liquid crystal molecules 84' when they are inclined. While the relation between the transmission axes of the polarizing plates 85, 86 and the inclined position of the liquid crystal molecules 84' will be described later, suffice it to say at this point that the orientation of the plates is set such that the axis of the first polarizing plate 85 matches the extended direction of the scanning line 72 and the axis of the second polarizing plate 86 matches the extended direction of the signal line 73.

Then, since the liquid crystal molecules 84' are vertically aligned when an electric field is not generated between the pixel electrode 74 and the common electrode 81, linearly polarized transmission light that has passed the first polarizing plate 85 directly passes through the liquid crystal layer 84 in the state of linearly polarized light and is blocked by the second polarizing plate 86 to create black display. Further, since the liquid crystal molecules 84' become horizontally inclined when voltage of a predetermined amount is applied to the pixel electrode 74 to generate an electric field between the pixel electrode 74 and the common electrode 81, the linearly polarized transmission light that has passed the first polarizing plate 85 becomes elliptically polarized light in the liquid crystal layer 84 and passes through the second polarizing plate 86 to create white display.

Next, the shapes of the slits 76 and the protrusions 82 will be described. The slits 76 are formed by removing a part of the pixel electrode 74 by means of photolithography or the like, and the protrusions 82 are constituted by forming a resist made of acrylic resin or the like into a predetermined shape also by means of photolithography, for example.

The protrusions 82 are formed in a zigzag state across a plurality of pixels, and their linear portions are extended in the direction of a 45° angle with respect to the signal line 73 when viewed from the normal direction of the second substrate 78. At the approximately central portion of one pixel, a protrusion 82a extending from one adjacent pixel is bent to a 90° angle to further extend to the adjacent pixel, while a protrusion 82b extending from another adjacent pixel is arranged to lie parallel with the linear portion of the protrusion 82b that is bent at right angle, and made to reside near the corner portion of the pixel.

The slits 76 are formed so as to be positioned midway between a plurality of protrusions 82, and three slits 76 are formed in each pixel electrode 74 as shown in FIG. 6 in this example. Slits 76a are severally formed between the protrusion 82a and the protrusion 82b, and a slit 76b are formed between the protrusion 82a and the edge portion of the pixel electrode 74. The central lines of slits 76a are parallel with the adjacent protrusion 82 and in the direction of a 45° angle with respect to the signal line 73. The central line of the slits 76a corresponds to the extending direction of the slits 76a. Further, the extending direction of the slit 76b is similarly parallel with adjacent protrusion 82a. Note that the extending direction of the protrusion 82a adjacent to the slit 76b is bent at right angle in the pixel, so that the extending direction of the slit 76b is bent as well.

The liquid crystal molecules 84' are inclined in the direction of a 90° angle with respect to the protrusions 82 and the slits 76, and inclined in opposite directions at the protrusions 82 and the slits 76. A pair of polarizing plates having crossnicol arrangement is arranged outside a pair of glass substrates, whereby a 45° angle is made by the transmission axes of the polarizing plates and the direction of protrusions 82, while a 45° angle is made by the inclined liquid crystal molecules and the transmission axes of the polarizing plates when viewed from the normal direction of the polarizing plates. When the angle made by the inclined liquid crystal molecules and the transmission axes of the polarizing plates becomes 45°, transmission light can be obtained from the polarizing plates most efficiently.

The liquid crystal display panel having the above-described constitution is used for TVs and monitors where a wide viewing angle is particularly required.

On the other hand, traditionally, the demand for a wide viewing angle for liquid crystal display panels used in mobile devices such as cell phones or the like was not so high because the number of users for such devices was limited. However, demand for a wide viewing angle for the display section of liquid crystal display panels has been rapidly increasing in mobile devices that have recently become more functional.

Due to such increasing demand, the above-described MVA type of liquid crystal display panels has recently been developed in lieu of the conventional TN type that has been frequently been used for mobile devices.

Conventionally, among others, semi-transmissive liquid crystal display panels, which have the combined qualities of the transmissive type and the reflective type of LCD panels, have been developed in order to reduce power consumption requirements for liquid crystal display panels used in mobile devices intended for both outdoor and indoor use. The advanced state of development of the MVA type of liquid crystal display panels has been introduced in the semi-transmissive liquid crystal display panels disclosed in Japanese Laid-Open Patent Publication Nos. 2003-167253 and 2004-069767 and the like.

In developing the MVA type semi-transmissive liquid crystal display panel the inventors also initially experimented on the shapes of protrusions and slits formed in the conventional zigzag state as shown in FIG. 6, but noted that they were not suitable for small liquid crystal display panels for use in mobile devices. It is believed that this is due to the fact that the size of recently used pixels of small liquid crystal display panels producing high definition has been greatly reduced, while the zigzag-shaped protrusions and slits used in conventional medium and small sized liquid crystal display panels produced poor visual quality for TVs and monitors to which they were applied.

Then, the inventors conducted tests on the shape of a pixel electrode whose corners are chamfered as shown in FIGS. 13(b), (d), (f) and (h) of Japanese Laid-Open Patent Publication No. 2004-069767.

FIG. 8 shows a plane view of an example of a VA type of semi-transmissive liquid crystal display panel where the corners of the pixel electrode are chamfered while FIG. 9 shows the cross-sectional view taken along the IX-IX line of FIG. 8. Note that the reference numerals used in FIGS. 8 and 9 correspond to those used in FIGS. 6 and 7 and explanation therefor has been omitted.

Reference numeral 74a denotes a pixel electrode formed on the so-called light transmission section of a semi-transmissive display panel, and it is formed of ITO or such other transparent electrode material. The pixel electrode 74a is octagonal in shape with chamfered corner portions and resides almost entirely in the light transmission section. In the chamfered pixel electrode 74a, the distance from the center of the pixel electrode 74a to the end portion of a pixel electrode 74b is approximately the same in all directions.

Pixel electrode 74b is likewise composed of ITO and is formed on the so-called reflection section simultaneously with pixel electrode 74a. Reference numeral 74' denotes a reflection electrode constituted for the purpose of reflecting outside light at the reflection section. The reflection electrode 74' is made of a metallic material having high reflectivity such as aluminum. Note that the reflection electrode 74' is formed on the lower layer of the pixel electrode 74b to perform conduction and function as an electrode as well, but it need not electrically conduct with the pixel electrode 74b nor function as an electrode. What is important is that the reflection electrode should be capable of reflecting outside light at the reflection section.

Reference numeral 82' denotes a protrusion formed in the light transmission section. Unlike the linear protrusions formed in the entire pixel region, this protrusion is crossshaped and independently resides only in the light transmission section. With such protrusion 82' and the pixel electrode 74a whose corners are chamfered, it is possible to control the alignment of liquid crystal molecules evenly in the light transmission section of a small pixel in particular, and thereby produce a VA type of liquid crystal display panel with a wide viewing angle.

Reference numeral 82" denotes an inverted letter Y-shaped protrusion formed to reside only in the reflection section. Note that reference numeral 90 formed on the second substrate 78 denotes a part that is provided to make the distance of outside light passing through the reflection section and the distance of light originating from the backlight passing through the light transmission section approximately the same, and is referred to as a topcoat.

Further, Reference numeral 91 denotes a contact hole, and a drain electrode 75' of the TFT 75 is made to electrically contact the pixel electrode 74b via the contact hole 91.

Scanning signals are sequentially input by one frame to the scanning lines 72 shown in FIG. 8 and FIG. 9. However, a given level of voltage is applied to the scanning lines 72 even when there is no input of scanning signals At this point, while the scanning lines 72 are in an exposed state (viewed on a plane as shown in FIG. 9), a potential difference occurs between the scanning lines 72 and the common electrode 81 at any time, and the liquid crystal molecules 84' in this vicinity are always inclined.

As a countermeasure to picture quality deterioration, a known structure, is employed, the so-called Cs on-gate structure where the pixel electrode 74a is arranged on the scanning lines 72 in an overlaid manner. According to this structure, the end portion of the pixel electrode 74a is laid above the scanning line 72 to avoid affecting the quality of display, and the resulting potential difference that occurs between the scanning line 72 and the common electrode 81 does not affect the liquid crystal molecules 84', while the potential difference that occurs between the pixel electrode 74a and the common electrode 81 serves to control the inclination of the liquid crystal molecules 84'.

However, even if this structure is employed in the liquid crystal display panel represented in FIGS. 8 and 9, the scanning line 72 appears completely at the position where the corner portion of the pixel electrode 74a is chamfered as illustrated in FIG. 10, which is a cross-sectional view of the liquid crystal display 70 taken along the X-X line of FIG. 8, while the potential difference that occurs between the scanning line 72 and the common electrode 81 causes the constant inclination of the liquid crystal molecules 84', which results in the constant leakage of light originating from the backlight to constantly leak even during black display, thereby reducing contrast efficiency.

SUMMARY OF THE INVENTION

In view of the above-mentioned, the present inventors aim to provide an MVA type of liquid crystal display panel having high contrast efficiency, where contrast reduction caused by the inclination of liquid crystal molecules which is induced by a potential difference that occurs between a scanning line and a common electrode can be controlled even in a liquid crystal display panel employing pixel electrodes whose corner portions are chamfered.

The present invention provides for a liquid crystal display panel comprising a first substrate where a pixel electrode, whose corner portions are chamfered, is formed in each position partitioned by signal lines and scanning lines that are arranged in a matrix state, a second substrate on which a common electrode is formed, alignment films of vertical alignment treatment, which are laid severally on both substrates, and a liquid crystal layer having negative dielectric anisotropy and being arranged between both substrates, in which a protruding electrode extending along the scanning lines is formed on the pixel electrode at the chamfered corner portion of the pixel electrode.

With the above-described means, it is possible to provide an MVA type of liquid crystal display panel having high contrast efficiency, where contrast reduction caused by the inclination of liquid crystal molecules which is induced by a potential difference that occurs between a scanning line and a common electrode can be controlled.

Further, by forming the protruding electrode particularly in the light transmission area of the liquid crystal display panel, the conspicuously adverse affect of the potential difference between the scanning line and the common electrode can be effectively suppressed.

Furthermore, by arranging the protruding electrode so as to overlap the scanning line, the above-described excellent effect is not impaired even if a slight mask slippage or the like occurs during manufacturing.

PREFERRED EMBODIMENTS OF THE INVENTION

Examples of the present invention will hereafter be described with reference to the drawings. Although the following examples show the embodiments of a transmissive or semi-transmissive liquid crystal display panel pertaining to the technical concept of the present invention, they are not intended to limit the applicability of the present invention. Further, the liquid crystal display panel described in the examples shows a small liquid crystal display panel mainly used in the display section for mobile devices such as digital cameras and cell phones, and illustrates a panel of about 2.2 inches with a definition exceeding 300 ppi, having 640×480 (VGA) pixels or 320×240 pixels (QVGA). The size of one pixel is also significantly smaller than that of a liquid crystal display panel for a TV set of 40 inches or the like.

Figure 1:
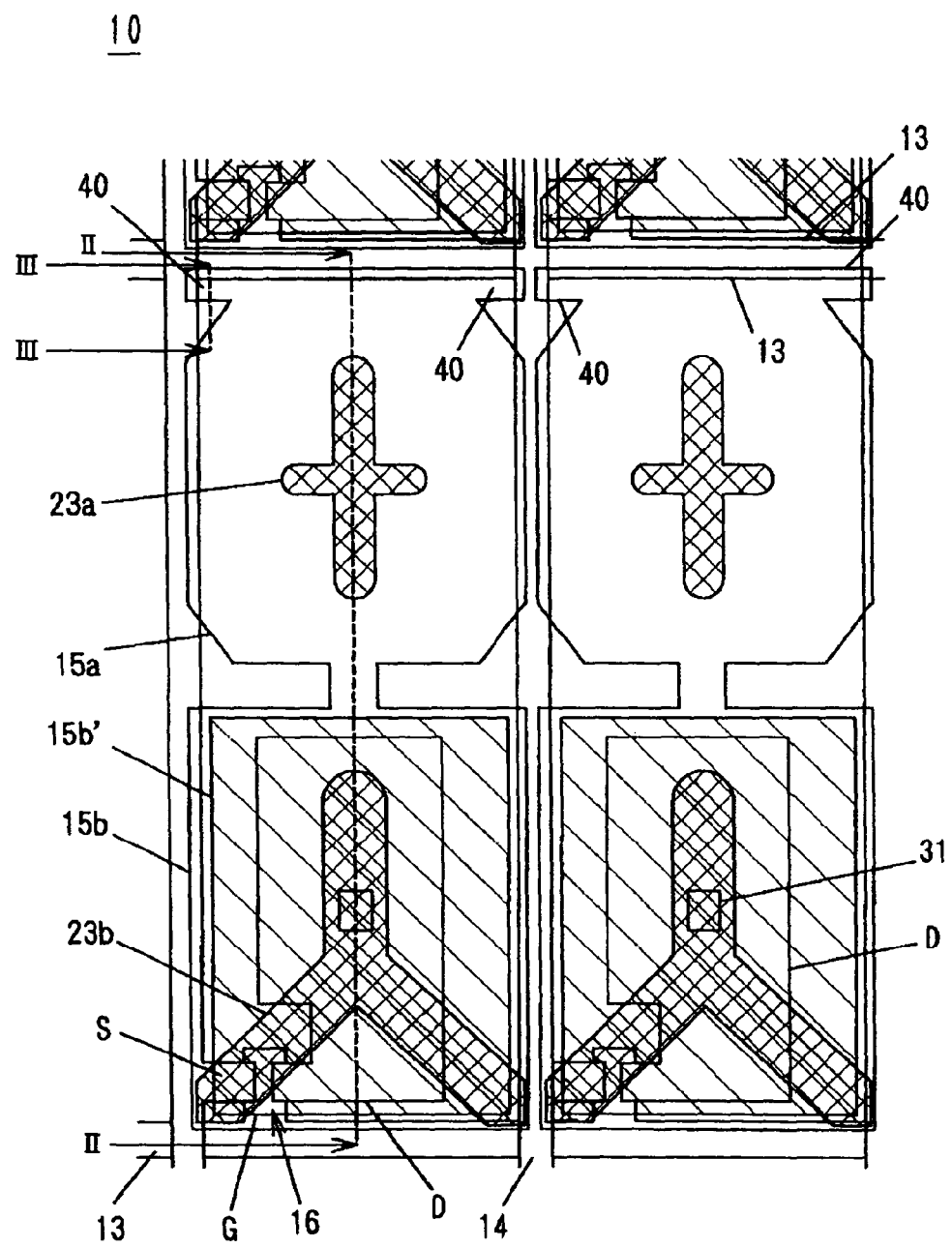
FIG. 1 is a schematic plane view of a pixel area of a semi-transmissive liquid crystal display panel according to the present invention, when viewed through a color filter.
Figure 2:
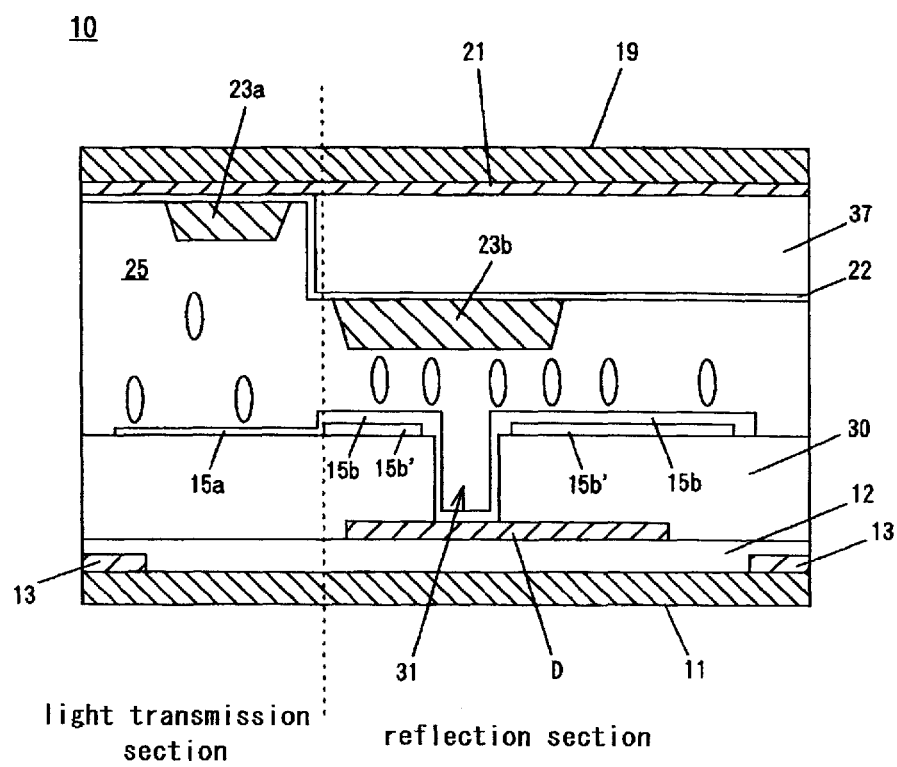
FIG. 2 is a cross-sectional view taken along the II-II line of FIG. 1.

FIGS. 1 and 2 show the semi-transmissive liquid crystal display panel according to Example 1. Note that FIG. 1 is a schematic plane view of two pixel areas of the semi-transmissive liquid crystal display panel when viewed through a color filter, and FIG. 2 is the cross-sectional view taken along the II-II line of FIG. 1.

In FIGS. 1 and 2, a semi-transmissive liquid crystal display panel 10 is constituted such that scanning lines 13 and signal lines 14 are wired in a matrix state on a transparent first substrate 11 such as a glass substrate via a gate insulating film 12. The region surrounded by the scanning lines 13 and the signal lines 14 corresponds to one pixel, and a pixel electrode 15 made of transparent conductive material such as ITO is formed therein. The pixel is partitioned into a reflection section and a light transmission section at the middle portion thereof, while the pixel electrode 15 consists of a pixel electrode 15a that exists in the light transmission section and a pixel electrode 15b that exists in the reflection section. The shape and other features of the pixel electrode 15a will be described later in detail.

A reflection electrode 15b' is formed on the lower layer of the pixel electrode 15b as shown in the hatched section of FIG. 1. The reflection electrode 15b' is formed to reflect outside light on the reflection section, and it has the same size as that of the pixel electrode 15b although it is shown in FIG. 1 to be smaller, and constitutes the reflection section in one pixel. The reflection electrode 15b' is formed of a metallic material with a high degree of reflectivity such as aluminum.

Note that the reflection electrode 15b' electrically conducts with the pixel electrode 15b and functions as an electrode as well, but it need not electrically conduct with the pixel electrode 15b nor function as an electrode. The point is that the reflection electrode should be capable of reflecting outside light at the reflection section.

A TFT 16 that serves as a switching device for connection to the pixel electrode 15 is formed at the area where the scanning line 13 and the signal line 14 intersect. The TFT 16 comprises a gate electrode G connected to the scanning line 13, a source electrode S connecting to the signal line 14, a semiconductor such as amorphous silicon, and a drain electrode D that connects to the gate insulating film 12 and the pixel electrode 15b, and the like.

The drain electrode D is formed with a size large enough to cover the majority portion of the reflection section in one pixel. By forming such a large drain electrode D, it is possible to secure a good degree of auxiliary capacitance by forming an auxiliary capacitance line (not shown). When a small liquid crystal display panel with high definition is manufactured, the pixel capacitance formed between the pixel electrode and the common electrode is not sufficient for performing display because the size of one pixel is very small, and securing large auxiliary capacitance is therefore considered important. Large auxiliary capacitance can be secured by forming such a large drain electrode D. Note that the auxiliary capacitance line (not shown) may be simultaneously formed to lie parallel with the scanning lines 13, for example, and this is the so-called Cs on-common structure. Although not shown, the alignment film covering the pixel electrode 15 is set in vertical alignment treatment.

An insulating film layer 30 is formed on the gate insulating film 12 and the drain electrode D, and a contact hole 31 is formed in the insulating film layer 30. The pixel electrode 15 and the drain electrode D are electrically conducted via the contact hole 31. Although the insulating film layer 30 is shown as one layer in the example, another insulating film layer made of an organic material may be formed, for example, and outside light is scattered by making the surface of the insulating film layer uneven (not shown) in order to make the reflection electrode 15b' uneven in shape.

Further, a black matrix (not shown) is formed on the transparent second substrate 19 such as glass substrate so as to partition each pixel, and a color filter 21 is laid corresponding to each pixel. The color filter 21 having any one of red (R), green (G) and blue (B) hues is arranged corresponding to each pixel.

Then, a topcoat layer 37 is formed on the color filter 21 in the reflection section to adjust the distance of light passing though the reflection section and the distance of light passing through the light transmission section of the liquid crystal layer 25 to be approximately the same.

A common electrode 22 made of a transparent electrode such as ITO, for example, is laid on the color filter 21 in the light transmission section and on the topcoat layer 37 in the reflection section.

A cross-shaped protrusion 23a is formed on the common electrode 22 in the light transmission section, and an inverted letter Y shaped protrusion 23b is formed in the reflection section of the common electrode 22, and the common electrode 22 and the protrusions 23a, 23b are covered by an alignment film (not shown) set in vertical alignment treatment.

The liquid crystal layer 25 having negative dielectric anisotropy is laid between the substrates 11, 19. When an electric field is not generated between the pixel electrode 15 and the common electrode 22, the liquid crystal molecules are restricted by the alignment films 18, 24 and become vertically aligned, but become horizontally inclined when an electric field is generated between the pixel electrode 15 and the common electrode 22. At this point, the liquid crystal molecules become inclined in a predetermined direction due to the protrusion 23 and the end portion of the pixel electrode 15, and a plurality of domains can thus be formed in one pixel. Meanwhile, although the alignment of liquid crystal molecules has conventionally been restricted by the protrusion 23 and slit formed in the pixel, the inclined direction of liquid crystal molecules can be also restricted by the end portion of the pixel electrode 15 since the end portion of the pixel electrode 15 serves as the slit. Further, the slit may be formed instead of the protrusion 23 by removing a part of the common electrode 22 to form a predetermined shape.

Polarizing plates and λ/4 retardation plates are severally arranged outside the first substrate 11 and outside the second substrate 19. Further, the polarizing plates are set such that their transmission axes are orthogonal to each other. Then, when an electric field is not generated between the pixel electrode 15 and the common electrode 22, the liquid crystal molecules become vertically aligned, so that the linearly polarized transmission light that has passed through the first polarizing plate directly passes through the liquid crystal layer 25 in the state of linearly polarized light and is blocked by the second polarizing plate to create black display. Furthermore, when predetermined amount of voltage is applied to the pixel electrode 15 to generate an electric field between the pixel electrode 15 and the common electrode 22, the liquid crystal molecules become horizontally inclined, so that the linearly polarized transmission light that has passed through the first polarizing plate becomes elliptically polarized light in the liquid crystal layer 25, and passes through the second polarizing plate to create white display. Note that the constitution of the polarizing plate and the retardation plate in the semi-transmissive liquid crystal display panel described in the above-described Japanese Laid-Open Patent Publication No. 2004-069767 or Japanese Laid-Open Patent Publication No. 2000-29010 may be applied.

Note likewise that, in the second substrate 19, the so-called topcoat layer 37 is formed on the color filter 21 in the reflection section to adjust the distance of light passing though the reflection section and the distance of light passing through the light transmission section of the liquid crystal layer 25 to become approximately the same.

Next, description will be made for the shape of the pixel electrode 15a or the like formed in the light transmission section. In the present invention as well, the pixel electrode 15a residing in the light transmission section is basically formed on almost the entire area of a rectangular light transmission region and is octagonal in shape, whose corner portions are chamfered. The pixel electrode 15a and the protrusion 23 formed near the center of the pixel electrode 15a serve to restrict the alignment of liquid crystal molecules in the light transmission section.

Furthermore, the end portion of the pixel electrode 15a overlaps the scanning line 13, and the pixel electrode 15a has a protruding electrode 40 extending along the direction of the scanning line 13 between the chamfered corner portions and the scanning line 13. Conventionally, the scanning line 13 completely emerges at the chamfered corner portion of the pixel electrode 15a and the liquid crystal molecules have always been inclined due to the effect of the potential difference that occurs between the scanning line 13 and the common electrode 22. However, due to the presence of the protruding electrode 40, the potential difference that occurs between the protruding electrode 40 and the common electrode 22 exerts an influence on the liquid crystal molecules, making it possible to prevent the inclination of the liquid crystal molecules at the chamfered position as well as reduction of contrast.

Particularly, unlike the light transmission section where light originating from the backlight always passes, in the reflection section at which unstable outside light is reflected, the reflection electrode 15b' is formed so as to overlap the scanning line 13 in order to secure the largest portion of the region as may be possible, and thus, even when the liquid crystal molecules become inclined due to the effect of the potential difference occurring between the scanning line 13 and the common electrode 22, the effect is minimal. However, in the light transmission section, the corner portions of the pixel electrode 15a are chamfered for the purpose of restricting the alignment of liquid crystal molecules evenly.

Figure 3:
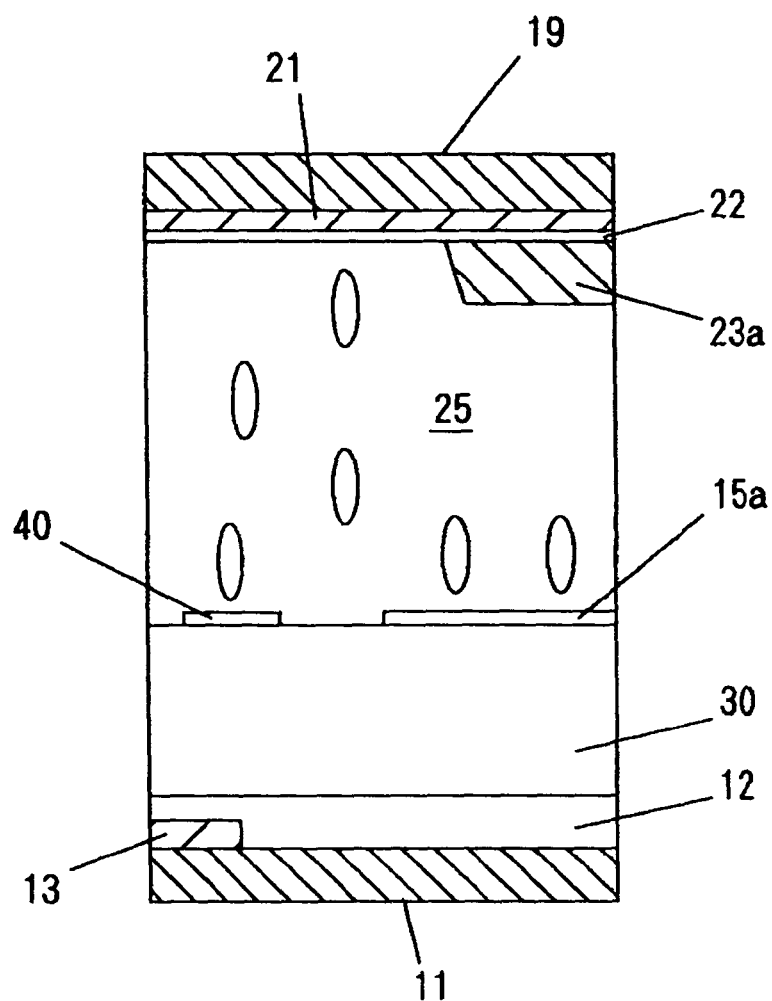
FIG. 3 is a cross-sectional view taken along the III-III line of FIG. 1.

Therefore, the present invention is particularly effective for providing a liquid crystal display panel with a light transmission section, in which light originates from the backlight as a light source. Note that FIG. 3 is the cross-sectional view taken along the III-III line of FIG. 1 and represents the state where the liquid crystal molecules are prevented from becoming inclined due to the presence of the protruding electrode 40.

Meanwhile, the protruding electrode 40 is made to lie over the scanning line 13 in FIG. 1, although this is not necessary as long as the inclination of the liquid crystal molecules due to the resulting potential difference between the scanning line 13 and the common electrode 22, does not affect display. Thus, the scanning line 13 and the protruding electrode 40 are not overlaid but may reside facing each other, but should slightly overlap in consideration of the possibility of mask slippage during manufacturing. In this example, the protruding electrode 40 is about 4 μm and overlaps with the scanning line 13 by about 2 μm. Further, the size of the pixel electrode 15a in the light transmission section is about 60×40 μm, and the corner portions of the pixel electrode 15a are chamfered. The maximum distance between the end portion of the chamfered pixel electrode 15a and the protrude electrode 40 is about 9 μm.

Still further, the pixel electrode 15a in this example is basically octagonal in shape, but it may also be polygonal or elliptical. The point is that in the case of a rectangular pixel, the corner portions of the pixel electrode should be chamfered. Also, in the present invention, the protruding electrode 40 is formed between the chamfered corner portion of the pixel electrode and the scanning line for the purpose of regulating the inclination of liquid crystal molecules residing between such corner portion and the scanning line, thereby making it possible to prevent the reduction of contrast.

Next, description will be made for Example 2 represented in FIG. 4, using the same reference numerals corresponding to those used for similar parts referred to in Example 1 and accordingly explanation therefor has been omitted.

Figure 4:
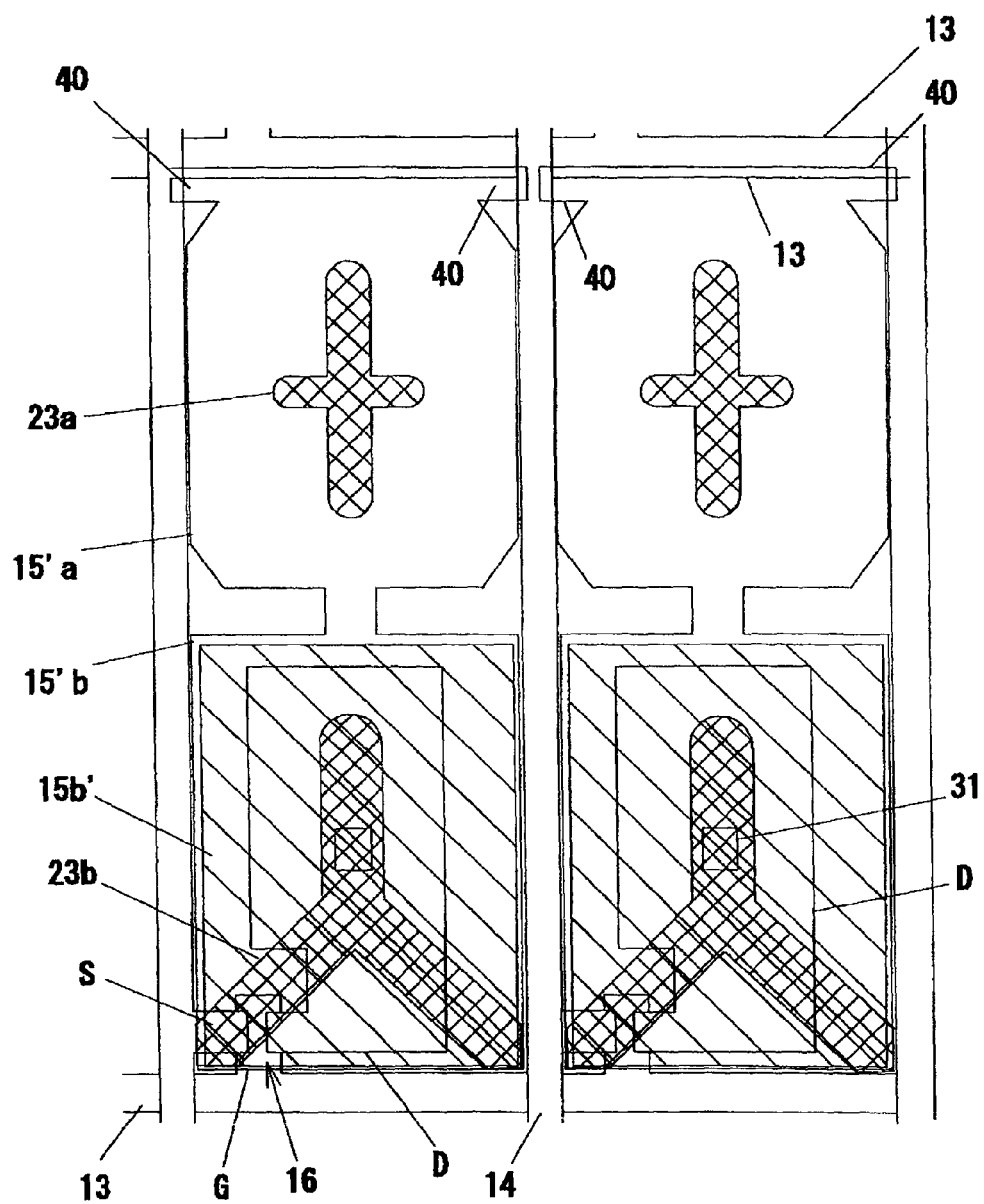
FIG. 4 is a schematic plane view of a pixel area of a semi-transmissive liquid crystal display panel according to another example of the present invention, when viewed through a color filter.
Figures 5A, 5B:
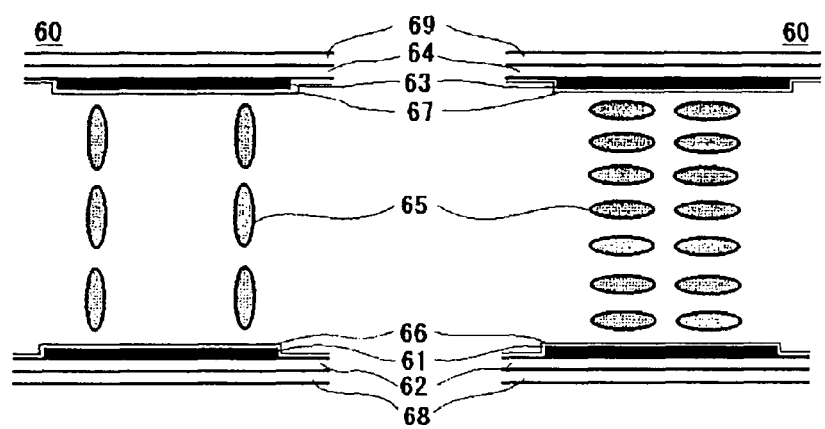
FIG. 5 is a schematic plane view of a conventional VA type of liquid crystal display device.
Figure 6:
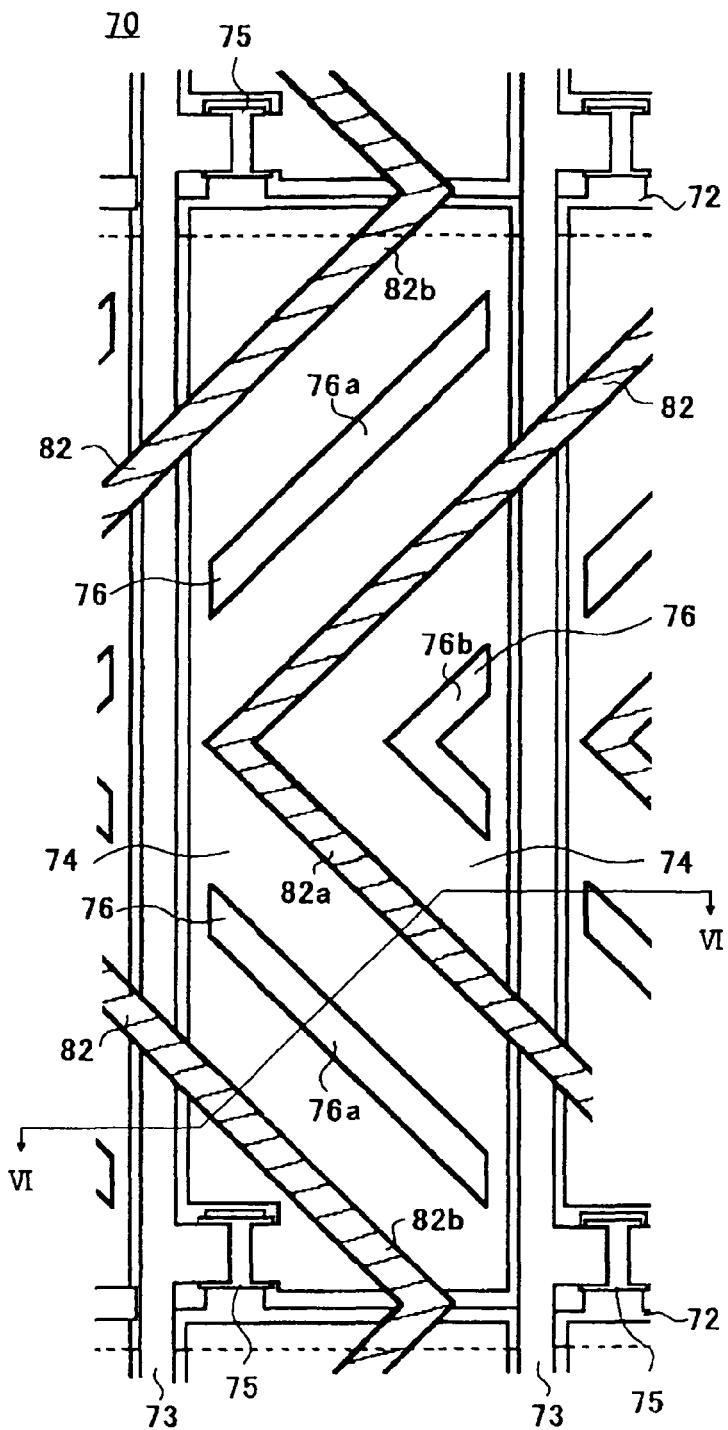
FIG. 6 is a plane view of a pixel of a conventional MVA type of a liquid crystal display panel 70.
Figure 7:
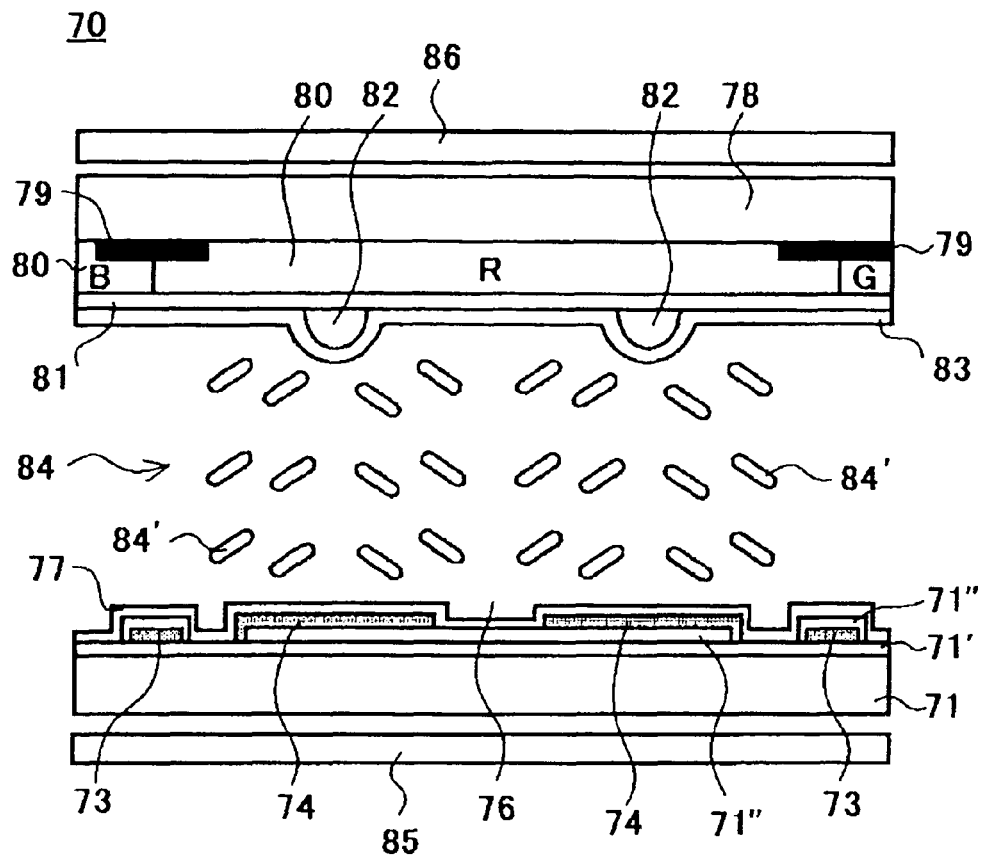
FIG. 7 is a cross-sectional view taken along the VII-VII line of FIG. 6.
Figure 8:
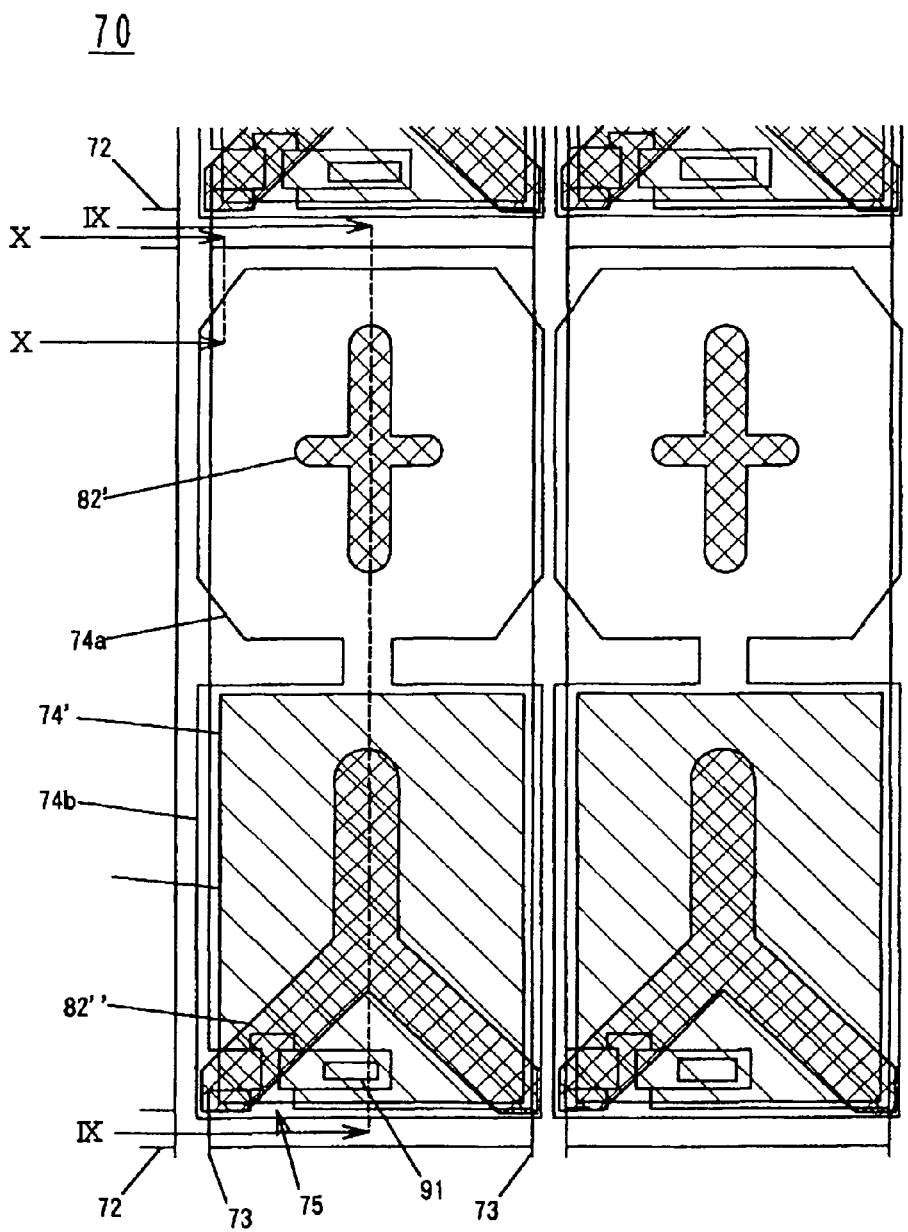
FIG. 8 is a plane view of a conventional VA type of semi-transmissive liquid crystal display panel where the corners of the pixel electrode are chamfered.
Figure 9:
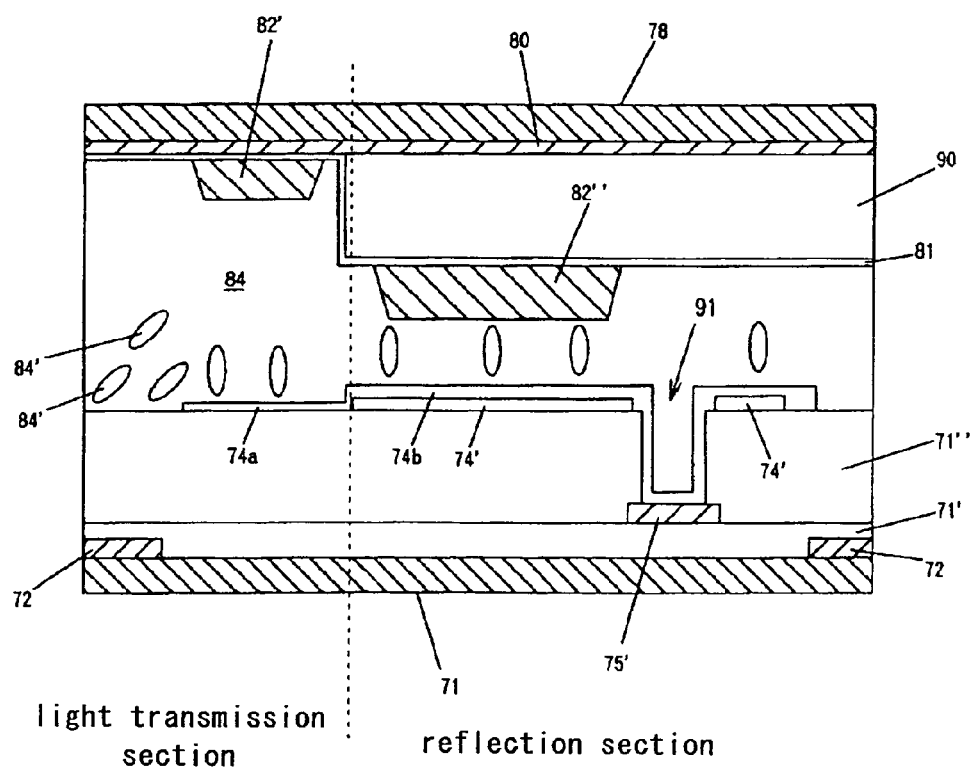
FIG. 9 shows a cross-sectional view taken along the IX-IX line of FIG. 8.
Figure 10:
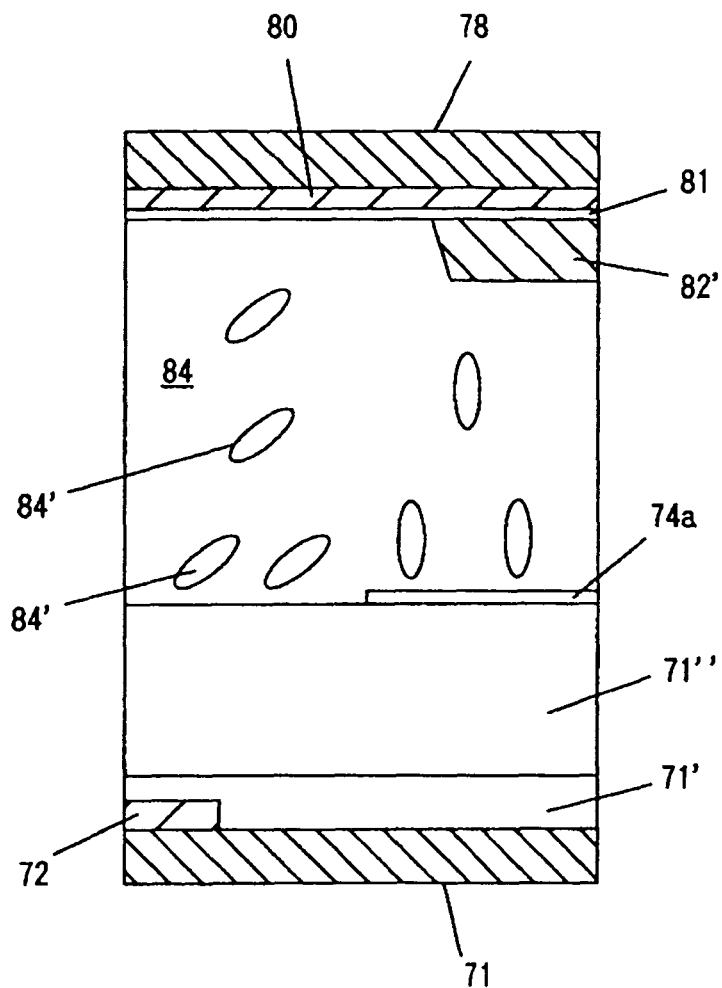
FIG. 10 shows a cross-sectional view taken along the X-X line of FIG. 8.

The significant difference between Example 2 represented in FIG. 4 and Example 1 is the positional relationship of the pixel electrode 15'a residing in the light transmission section and the pixel electrode 15'b existing in the reflection section, which constitute the pixel electrode 15 in the plane view, with signal lines.

In Example 1, the end portions of the pixel electrode 15a and the pixel electrode 15b in the plane view are located at positions where they slightly overlap with the signal lines 14. On the other hand, in Example 2, the end portions of the pixel electrode 15'a and the pixel electrode 15'b are located at positions where they do not overlap with the signal lines 14, that is, at facing positions or positions having a gap.

For example, in the case of the TN type of liquid crystal panel, it is often the case that the end portions of pixel electrodes generally overlap with the signal lines. This is because many of the TN type of panels normally have a white mode, and if a gap exists between the end portions of pixel electrodes and the signal lines when potential difference is generated in the liquid crystal to perform black display, light leakage occurs at the gap portions, inducing the panel to have low contrast efficiency. In addition, the end portions of pixel electrodes overlap with the signal lines to prevent light leakage.

On the other hand, the MVA type of liquid crystal display panel normally has a black mode. Therefore, even if a gap exists between the end portions of pixel electrodes 15 and the signal lines 14, light leakage at the gap portions does not occur to create black display, so that contrast reduction is controlled. On the contrary, if the end portions of pixel electrodes 15 overlap with the signal lines 14, capacitance forms in the area where the gate insulating film 12 and the insulating film 30 reside between the pixel electrodes and the signal lines 14, which could adversely affect the quality of display.

Therefore, by locating the end portions of the pixel electrode 15'a and the pixel electrode 15b at positions where they do not overlap with the signal lines 14 as exemplified by Example 2 of the present invention, capacitance does not arise between the pixel electrodes 15 and the signal lines 14, which would be preferable, and it becomes possible to provide an MVA type of liquid crystal display panel having better display resolution.

What is claimed is:

1. A liquid crystal display panel, comprising:
a first substrate where a pixel electrode, whose corner portions are chamfered, is formed in each position partitioned by signal lines and scanning lines that are arranged in a matrix state;
a second substrate on which a common electrode is formed;
alignment films of vertical alignment treatment, which are severally laid on both of the said substrates; and
a liquid crystal layer having negative dielectric anisotropy, and being arranged between both of the said substrates,
wherein the pixel electrode includes a protruding electrode symmetrically protruding from the pixel electrode in opposite directions along the scanning line and extending along the scanning line, the protruding electrode being formed between the chamfered corner portions of the pixel electrode and between the pixel electrode and the scanning line to prevent the inclination of liquid crystal molecules residing at the chamfered corner portions and reduction of contrast.

2. The liquid crystal display panel according to claim 1, wherein the said protruding electrode is formed so as to overlap the said scanning line.

3. The liquid crystal display panel according to claim 1, wherein each chamfered corner portion extends to a signal line.

4. The liquid crystal display panel according to claim 1, wherein a space is defined between the chamfered corner portions and the protruding electrode along the signal lines on each side of the protruding electrode.

5. The liquid crystal display panel according to claim 1, wherein the protruding electrode is a rectangular strip in shape and extends along the scanning line and overlays the signal lines on each side of the pixel electrode.

6. A liquid crystal display panel, comprising:
a first substrate where a light transmission section comprising a pixel electrode, whose corner portions are chamfered, is formed in each position partitioned by signal lines and scanning lines that are arranged in a matrix state;

a second substrate on which a common electrode is formed;

alignment films of vertical alignment treatment, which are severally laid on both of the said substrates; and a liquid crystal layer having negative dielectric anisotropy, and being arranged between both of the said substrates, wherein the pixel electrode includes a protruding electrode symmetrically protruding from the pixel electrode in opposite directions along the scanning line and extending along the scanning line, the protruding electrode being formed between the chamfered corner portions of the pixel electrode and between the pixel electrode and the scanning line to prevent the inclination of liquid crystal molecules residing at the chamfered corner portions and reduction of contrast.

7. The liquid crystal display panel according to claim 6, wherein a reflection section to reflect outside light is also formed in each position partitioned by the signal lines and the scanning lines that are arranged in the said matrix state.

8. The liquid crystal display panel according to claim 6, wherein the said protruding electrode is formed so as to overlap the said scanning line.

9. A liquid crystal display panel, comprising:

a first substrate where a pixel electrode, whose corner portions are chamfered, is formed in each position partitioned by signal lines and scanning lines that are arranged in a matrix state;

a second substrate on which a common electrode is formed;

alignment films of vertical alignment treatment, which are severally laid on both of the said substrates; and a liquid crystal layer having negative dielectric anisotropy, and being arranged between both of the said substrates, wherein the pixel electrode includes a protruding electrode extending along the scanning line, the protruding electrode being formed between the chamfered corner portions of the pixel electrode and between the pixel electrode and the scanning line to prevent the inclination of liquid crystal molecules residing at the chamfered corner portions and reduction of contrast, and wherein the protruding electrode is a rectangular strip in shape and extends along the scanning line and overlays the signal lines on each side of the pixel electrode.

* * * * *